(12) United States Patent
Che et al.

(10) Patent No.: US 11,706,086 B1
(45) Date of Patent: Jul. 18, 2023

(54) METHOD AND SYSTEM FOR MONITORING SWITCH ON BASIS OF BMC, AND DEVICE AND MEDIUM

(71) Applicant: INSPUR SUZHOU INTELLIGENT TECHNOLOGY CO., LTD., Jiangsu (CN)

(72) Inventors: Shengna Che, Jiangsu (CN); Shaomei Wang, Jiangsu (CN); Yong Liu, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/012,929

(22) PCT Filed: Jun. 29, 2021

(86) PCT No.: PCT/CN2021/103323
§ 371 (c)(1),
(2) Date: Dec. 25, 2022

(87) PCT Pub. No.: WO2022/052580
PCT Pub. Date: Mar. 17, 2022

(30) Foreign Application Priority Data

Sep. 10, 2020 (CN) .......................... 202010945649.6

(51) Int. Cl.
*H04L 41/0803* (2022.01)
*H04L 43/0805* (2022.01)
*H04L 43/16* (2022.01)

(52) U.S. Cl.
CPC ...... *H04L 41/0803* (2013.01); *H04L 43/0805* (2013.01); *H04L 43/16* (2013.01)

(58) Field of Classification Search
CPC .. H04L 41/0803; H04L 43/0805; H04L 43/16
See application file for complete search history.

(56) References Cited

U.S. PATENT DOCUMENTS 10,521,273 B2 * 12/2019 Mullender ............ G06F 9/4411
2018/0173529 A1 * 6/2018 Tamir .................... G06F 9/3009
(Continued)

FOREIGN PATENT DOCUMENTS

| CN | 104620539 A | * | 5/2015 | ......... H04L 41/0213 |
| CN | 106844162 A | | 6/2017 | |

(Continued)

OTHER PUBLICATIONS

PCT/CN2021/103323 international search report.

*Primary Examiner* — Jerry B Dennison
(74) *Attorney, Agent, or Firm* — IPro, PLLC (57) ABSTRACT

The present disclosure relates to a baseboard management controller (BMC)-based switch monitoring method, a system, a computer device, and a readable medium thereof. The BMC-based switch monitoring method includes: virtualizing a multi-core BMC into a plurality of logical computers such that each core operates separately; in response to start of a switch, migrating functions of the switch into a first core of the multi-core BMC for start, and monitoring other cores of the multi-core BMC based on a second core of the multi-core BMC; determining, in response to that a new service is received by the switch is detected, whether the new service is a firmware upgrade service; and allocating the new service to the second core in the multi-core BMC for operation, in response to that the new service is the firmware upgrade service.

18 Claims, 4 Drawing Sheets

(56) References Cited

U.S. PATENT DOCUMENTS

| | | | | |
|---|---|---|---|---|
| 2018/0357108 | A1* | 12/2018 | Mullender | G06F 9/45558 |
| 2019/0044892 | A1* | 2/2019 | Mangan | G06F 15/173 |
| 2019/0146851 | A1* | 5/2019 | Hu | G06F 9/45558 |
| | | | | 718/104 |
| 2020/0151005 | A1* | 5/2020 | Park | G06F 9/5038 |
| 2021/0216484 | A1* | 7/2021 | Kamath | G06F 13/102 |
| 2023/0130553 | A1* | 4/2023 | Radev | G06F 9/4856 |
| | | | | 714/4.11 |

FOREIGN PATENT DOCUMENTS

| | | | |
|---|---|---|---|
| CN | 109597719 | A | 4/2019 |
| CN | 110445638 | A | 11/2019 |
| CN | 110998523 | A | 4/2020 |
| CN | 111176828 | A | 5/2020 |
| CN | 111338577 | A | 6/2020 |
| CN | 111338802 | A | 6/2020 |
| CN | 112134752 | A | 12/2020 |
| WO | 2020000354 | A1 | 1/2020 |

* cited by examiner

METHOD AND SYSTEM FOR MONITORING SWITCH ON BASIS OF BMC, AND DEVICE AND MEDIUM

CROSS-REFERENCE TO RELATED APPLICATION

The present disclosure claims the priority of the Chinese patent application filed on Sep. 10, 2020 before the CNIPA, China National Intellectual Property Administration with the application number of 202010945649.6 and the title of "METHOD AND SYSTEM FOR MONITORING SWITCH ON BASIS OF BMC, AND DEVICE AND MEDIUM", which is incorporated herein in its entirety by reference.

FIELD

The present disclosure relates to the field of switches, and more particularly to a baseboard management controller (BMC)-based switch monitoring method, a system, a computer device, and a readable medium thereof

BACKGROUND

As a separate system separate of a network operating system (NOS) of a central processing unit (CPU), a BMC has its separate processor and memory, and may operate separate of the NOS. In case of crash or hardware failure of the NOS, the BMC may still operate and perform management on the NOS or hardware resource diagnosis.

At present, most of BMCs are single chips. Switches become more and more powerful, for example, some switches involve information of four line cards and hundreds of sensors, and it is also necessary to monitor information of temperatures, voltages, currents, fan speeds, and the like of other devices. Therefore, the BMC needs much more time to poll these devices during monitoring than monitor other small switches, and is slow to sense exceptions of processing capability of display cards, chips, etc. Moreover, during firmware upgrading of the BMC, it is necessary to first ensure the normality of an upgrading function and suspend other functions for example monitoring, etc., and the switch cannot be monitored if having an exception during the suspension, so it is impossible to monitor the switch around the clock. A conventional BMC has a single core where functions are realized in parallel, and when a firmware upgrade service is required, other services are required to be suspended. The BMC cannot be restarted by itself in case of an exception in its monitoring process.

SUMMARY

In view of this, an object of embodiments of the present disclosure is to propose a BMC-based switch monitoring method, a system, a computer device, and a computer-readable storage medium thereof. A multi-core BMC is virtualized into a plurality of logical computers, and one of cores is used to monitor other cores, so that the switch may be monitored during firmware upgrading, and a service may be allocated, so as to avoid a single core of the BMC being used too much, improve the stability and reduce the maintenance cost.

Based on the above object, an aspect of the embodiments of the present disclosure provides a BMC-based switch monitoring method, including following steps: virtualizing a multi-core BMC into a plurality of logical computers such that each core operates separately; in response to start of a switch, migrating functions of the switch into a first core of the multi-core BMC for start, and monitoring other cores of the multi-core BMC based on a second core of the multi-core BMC; determining, in response to that a new service is received by the switch is detected, whether the new service is a firmware upgrade service; and allocating the new service to the second core in the multi-core BMC for operation, in response to that the new service is the firmware upgrade service.

In some embodiments, the method further includes: determining, in response to that the new service is not the firmware upgrade service, whether a utilization of the first core exceeds a preset threshold; and allocating the new service to the first core for operation, in response to that the utilization of the first core does not exceed the preset threshold.

In some embodiments, the method further includes: determining, in response to that the utilization of the first core exceeds the preset threshold, whether a utilization of a third core exceeds the preset threshold; and allocating the new service to the third core for operation, in response to that the utilization of the third core does not exceed the preset threshold.

In some embodiments, the method further includes: determining, in response to that utilizations of the cores in the multi-core BMC except the second core exceed the preset threshold, whether the utilization of the first core exceeds a second preset threshold; and allocating the new service to the first core, in response to that the utilization of the first core does not exceed the second preset threshold.

In some embodiments, the method further includes: suspending reception of the new service, in response to that the utilizations of the cores in the multi-core BMC except the second core exceed the second preset threshold.

In some embodiments, the allocating the new service to the second core in the multi-core BMC for operation includes: determining whether the firmware upgrade service in operation exists in the second core; and suspending input of the new service to the second core, in response to that the firmware upgrade service in operation exists in the second core.

In some embodiments, the method further includes: in response to that an exceptional process on other cores exists is detected, restarting the exceptional process.

Another aspect of the embodiments of the present disclosure also provides a BMC-based switch monitoring system, including: a virtualization module, configured to virtualize a multi-core BMC into a plurality of logical computers such that each core operates separately; a monitoring module, configured to, in response to start of a switch, migrate functions of the switch into a first core of the multi-core BMC for start, and monitor other cores of the multi-core BMC based on a second core of the multi-core BMC; a determining module, configured to determine, in response to that a new service is received by the switch is detected, whether the new service is a firmware upgrade service; and an execution module, configured to allocate the new service to the second core in the multi-core BMC for operation, in response to that the new service is the firmware upgrade service.

Still another aspect of the embodiments of the present disclosure also provides a computer device, including: at least one processor; and a memory, where the memory stores computer instructions capable of running in the processor, and when the instructions are executed by the processor, the steps of the above methods are implemented.

Yet still another aspect of the embodiments of the present disclosure also provides a computer-readable storage medium, storing a computer program, when the computer program is executed by a processor, the steps of the above methods are implemented.

The present disclosure has the following beneficial technical effects. A multi-core BMC is virtualized into a plurality of logical computers, and one of cores is used to monitor other cores, so that the switch may be monitored during firmware upgrading, and a service may be allocated, so as to avoid a single core of the BMC being used too much, improve the stability and reduce the maintenance cost.

BRIEF DESCRIPTION OF THE DRAWINGS

In order to describe the technical solutions in the embodiments of the present disclosure or the prior art more clearly, the drawings required to be used in descriptions about the embodiments or the prior art will be introduced briefly below. Apparently, the drawings in the description below are only some embodiments of the present disclosure. Those of ordinary skill in the art may further obtain other embodiments according to these drawings without creative work.

DETAILED DESCRIPTION OF THE EMBODIMENTS

In order to make the object, technical solutions, and advantages of the present disclosure clearer, the embodiments of the present disclosure will further be described below in detail in combination with specific embodiments and with reference to the drawings.

It should be noted that expressions using "first" and "second" in the embodiment of the present disclosure are intended to distinguish two different entities or different parameters with the same name, therefore, "first" and "second" are only for the sake of convenience of expression, and should not be understood as limiting the embodiments of the present disclosure, which is no longer specified in the subsequent embodiments.

Figure 1:
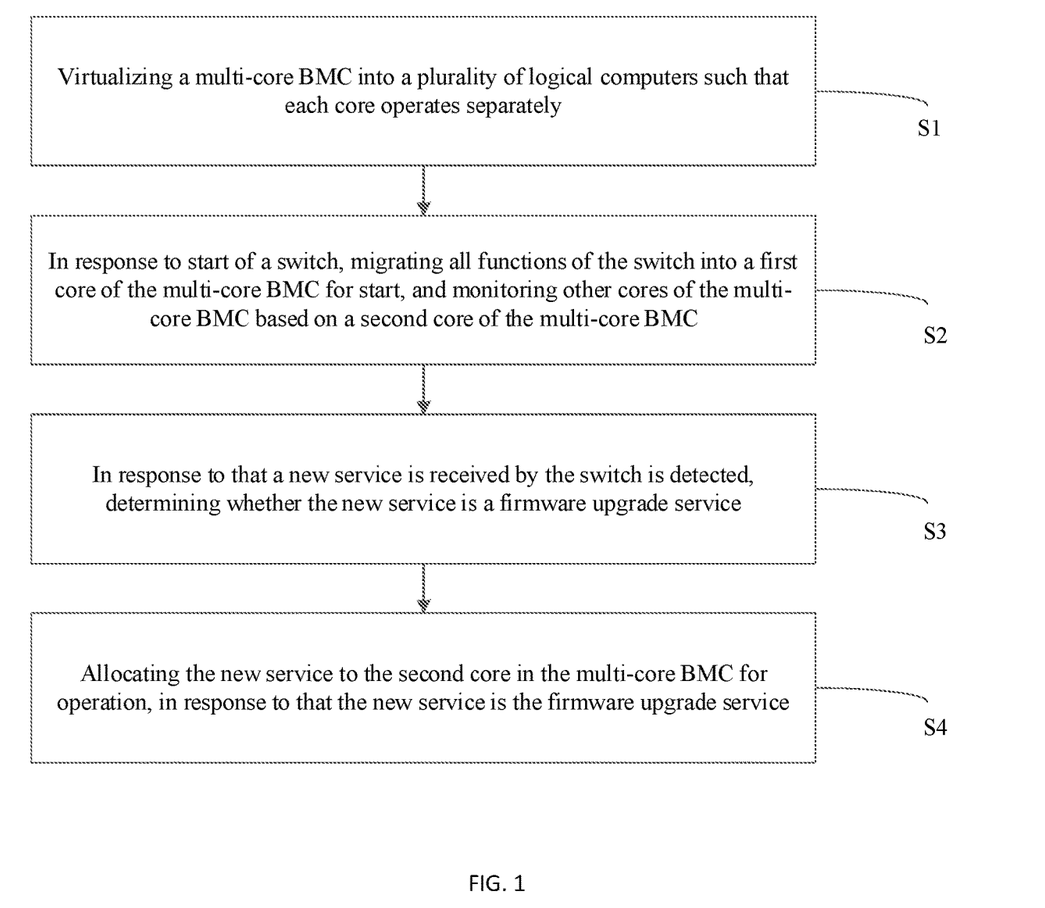
FIG. 1 is a schematic diagram of an embodiment of a BMC-based switch monitoring method according to the present disclosure.

Based on the above object, a first aspect of the embodiments of the present disclosure proposes an embodiment of a BMC-based switch monitoring method. FIG. 1 is a schematic diagram of an embodiment of a BMC-based switch monitoring method according to the present disclosure.

As shown in FIG. 1, the embodiment of the present disclosure includes the following steps.

In S1, a multi-core BMC is virtualized into a plurality of logical computers such that each core operates separately.

In S2, in response to start of a switch, functions of the switch are migrated into a first core of the multi-core BMC for start, and other cores of the multi-core BMC are monitored based on a second core of the multi-core BMC.

In S3, in response to that a new service is received by the switch is detected, whether the new service is a firmware upgrade service is determined.

In S4, the new service is allocated to the second core in the multi-core BMC for operation, in response to that the new service is the firmware upgrade service.

In the embodiment of the present disclosure, a multi-core BMC chip is virtualized into a plurality of logical computers. Under normal conditions, monitoring functions of the BMC chip are placed in a single core, and this core is used to scan a utilization of a CPU of the BMC chip in real time and scan a state of a current monitoring process in real time. When the utilization of the CPU of the BMC chip reaches a preset threshold, subsequent processes, services, and so on, are started in a third core and a fourth core. A service related to firmware upgrade and a real-time monitoring process are implemented separately in a second core. When a BMC, a basic input output system (BIOS), a complex programming logic device (CPLD) and a field programmable gate array (FPGA) are upgraded on the BMC, a normal monitoring service of the BMC is not affected, and the processing capability to handle exception is improved.

The multi-core BMC is virtualized into a plurality of logical computers such that each core may operate separately. Each core in the multi-core BMC may be virtualized into a logical computer. In other embodiments, two or more cores in the multi-core BMC may be virtualized into a logical computer.

In response to start of a switch, functions of the switch are migrated into a first core of the multi-core BMC for start, and other cores of the multi-core BMC are monitored based on a second core of the multi-core BMC. After the switch is started, the functions are started in the first core by default, and other cores in the BMC are monitored through the second core.

In response to that a new service is received by the switch is detected, whether the new service is a firmware upgrade service is determined. The new service is allocated to the second core in the multi-core BMC for operation, in response to that the new service is the firmware upgrade service.

In some embodiments, the method further includes: whether a utilization of the first core exceeds a preset threshold is determined, in response to that the new service is not the firmware upgrade service; and the new service is allocated to the first core for operation, in response to that the utilization of the first core does not exceed the preset threshold. For example, the preset threshold may be 80%. Whether the utilization of the first core exceeds 80% is determined. If the utilization of the first core does not exceed 80%, the new service is still allocated to the first core for operation.

In some embodiments, the method further includes: whether a utilization of a third core exceeds the preset threshold is determined, in response to that the utilization of the first core exceeds the preset threshold; and the new service is allocated to the third core for operation, in response to that the utilization of the third core does not exceed the preset threshold. Still in the above example, if the utilization of the first core exceeds 80%, whether the utilization of the third core exceeds 80% is determined. If the utilization of the third core does not exceed 80%, the new service may be allocated to the third core for operation. In this manner, if the utilization of the third core exceeds 80%, whether a utilization of a fourth core exceeds 80% is determined.

In some embodiments, the method further includes: whether the utilization of the first core exceeds a second preset threshold is determined, in response to that the utilizations of the cores in the multi-core BMC except the second core exceed the preset threshold; and the new service is allocated to the first core, in response to that the utilization of the first core does not exceed the second preset threshold. For example, the multi-core BMC has four cores, and the utilizations of the first core, the third core, and the fourth core exceed 80%. Whether the utilization of the first core exceeds the second preset threshold is determined, which may be, for example, 95%. If the utilization of the first core does not exceed 95%, the new service may be allocated to the first core for operation.

In some embodiments, the method further includes: reception of the new service is suspended, in response to that the utilizations of the cores in the multi-core BMC except the second core exceed the second preset threshold. Still in the above example, if the utilizations of the first core, the third core and the fourth core exceed 95%, it indicates that there are too many services in the switch and it is necessary to suspend reception of new services, and reception of the new services may be resumed after the utilizations of the cores are less than a preset threshold.

In some embodiments, the step that the new service is allocated to the second core in the multi-core BMC for operation includes: whether the firmware upgrade service in operation exists in the second core is determined; and input of the new service to the second core is suspended, in response to that the firmware upgrade service in operation exists in the second core. When a second firmware upgrade service is received before completion of a previous firmware upgrade service, input of any new firmware upgrade service to the second core may be suspended, so as to avoid impact on the previous firmware upgrade service.

In some embodiments, the method further includes: in response to that an exceptional process on other cores exists is detected, the exceptional process is restarted.

It is to be particularly pointed out that the respective steps in the respective embodiments of the above BMC-based switch monitoring method may be mutually intersected, replaced, added, and deleted. Therefore, these reasonable permutations, combinations, and transformations about the BMC-based switch monitoring method shall also fall within the scope of protection of the present disclosure, and the scope of protection of the present disclosure should not be limited to the embodiments.

Figure 3:
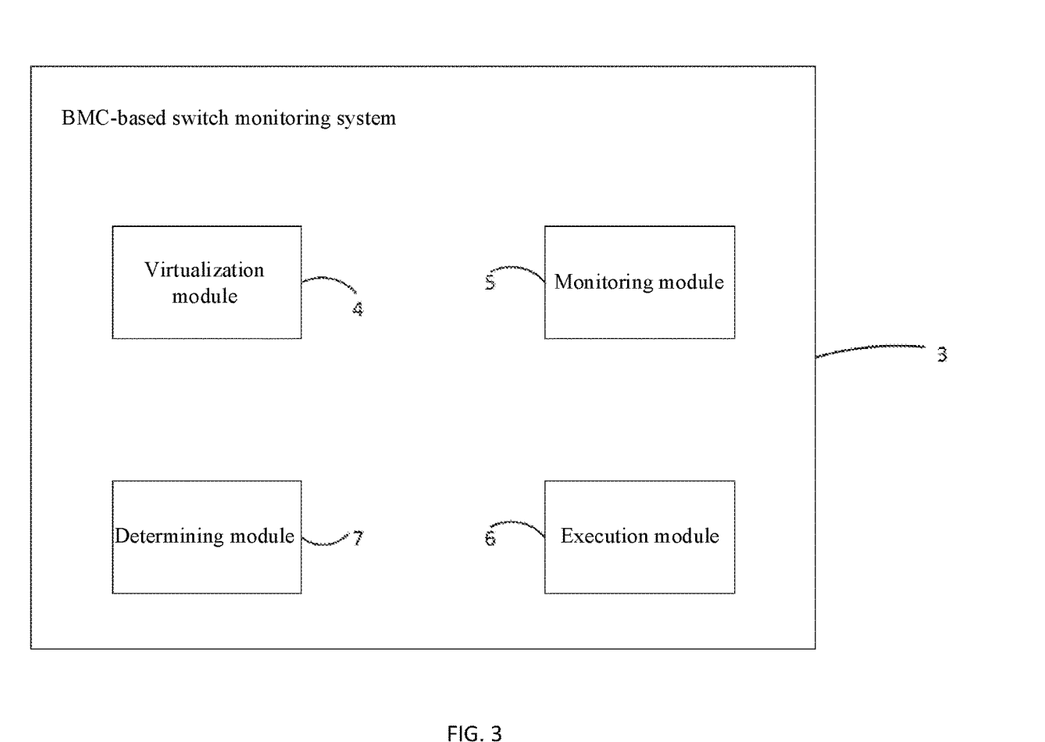
FIG. 3 is a schematic structural diagram of an embodiment of a BMC-based switch monitoring system according to the present disclosure.

Based on the above object, a second aspect of the embodiments of the present disclosure proposes a BMC-based switch monitoring system 3, which, as shown in FIG. 3, includes: a virtualization module 4, configured to virtualize a multi-core BMC into a plurality of logical computers such that each core operates separately; a monitoring module 5, configured to, in response to start of a switch, migrate functions of the switch into a first core of the multi-core BMC for start, and monitor other cores of the multi-core BMC based on a second core of the multi-core BMC; a determining module 7, configured to determine, in response to that a new service is received by the switch is detected, whether the new service is a firmware upgrade service; and an execution module 6, configured to allocate the new service to the second core in the multi-core BMC for operation, in response to that the new service is the firmware upgrade service.

In some embodiments, the system further includes a second determining module, configured to determine, in response to that the new service is not the firmware upgrade service, whether a utilization of the first core exceeds a preset threshold, and allocate the new service to the first core for operation in response to that the utilization of the first core does not exceed the preset threshold.

In some embodiments, the system further includes a third determining module, configured to determine, in response to that the utilization of the first core exceeds the preset threshold, whether a utilization of a third core exceeds the preset threshold, and allocate the new service to the third core for operation in response to that the utilization of the third core does not exceed the preset threshold.

In some embodiments, the system further includes a fourth determining module, configured to determine, in response to that utilizations of the cores in the multi-core BMC except the second core exceed the preset threshold, whether the utilization of the first core exceeds a second preset threshold, and allocate the new service to the first core in response to that the utilization of the first core does not exceed the second preset threshold.

In some embodiments, the system further includes a suspension module, configured to suspend reception of the new service, in response to that the utilizations of the cores in the multi-core BMC except the second core exceed the second preset threshold.

In some embodiments, the execution module 6 is configured to determine whether the firmware upgrade service in operation exists in the second core, and suspend input of the new service to the second core in response to that the firmware upgrade service in operation exists in the second core.

In some embodiments, the system further includes a restart module, configured to, in response to that an exceptional process on other cores exists is detected, restart the exceptional process.

Figure 4:
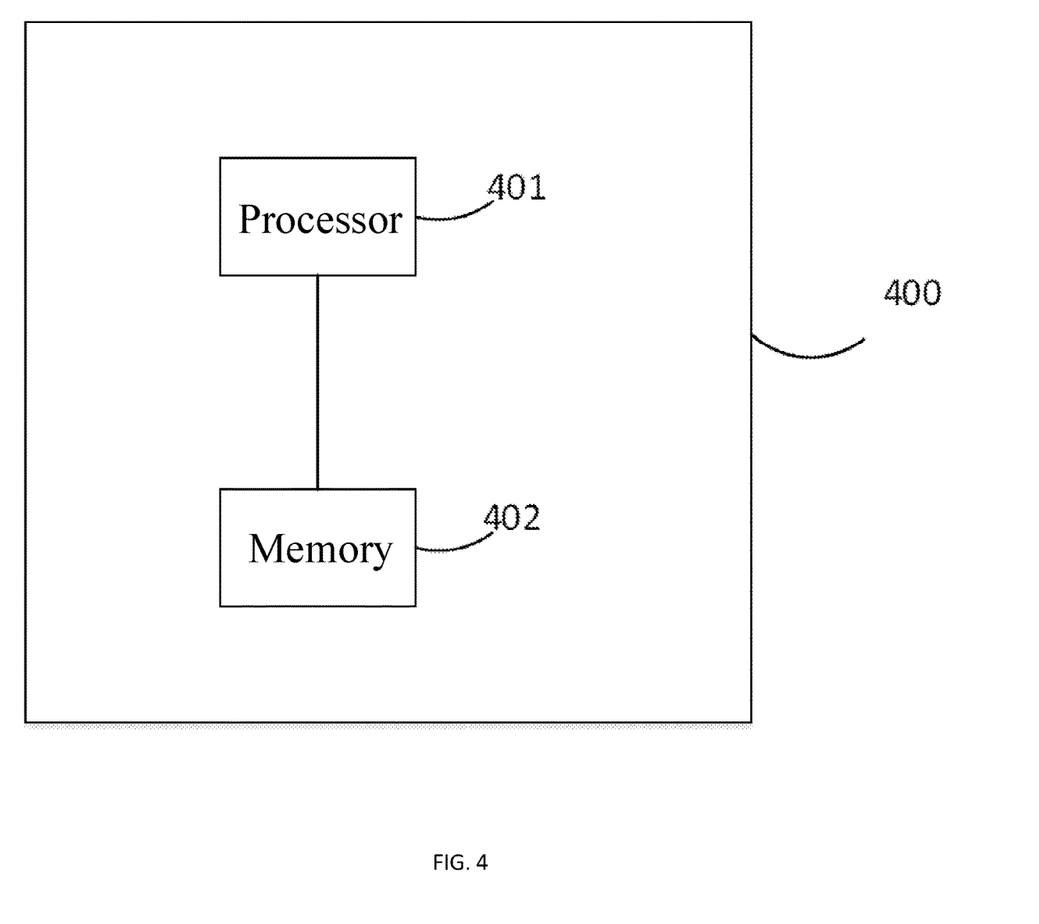
FIG. 4 is a schematic diagram of an embodiment of a BMC-based switch monitoring storage medium according to the present disclosure.

As shown in FIG. 4, based on the above object, a third aspect of the embodiments of the present disclosure proposes a computer storage device 400, including: at least one processor 401; and a memory 402. The memory 402 stores computer instructions capable of running in the processor 401. The instruction is executed by the processor 401 to implement the following steps: S1: virtualizing a multi-core BMC into a plurality of logical computers such that each core operates separately; S2: in response to start of a switch, migrating functions of the switch into a first core of the multi-core BMC for start, and monitoring other cores of the multi-core BMC based on a second core of the multi-core BMC; S3: determining, in response to that a new service is received by the switch is detected, whether the new service is a firmware upgrade service; and S4: allocating the new service to the second core in the multi-core BMC for operation, in response to that the new service is the firmware upgrade service.

In some embodiments, the steps further include: determining, in response to that the new service is not the firmware upgrade service, whether a utilization of the first core exceeds a preset threshold; and allocating the new service to the first core for operation, in response to that the utilization of the first core does not exceed the preset threshold.

In some embodiments, the steps further include: determining, in response to that the utilization of the first core exceeds the preset threshold, whether a utilization of a third core exceeds the preset threshold; and allocating the new service to the third core for operation, in response to that the utilization of the third core does not exceed the preset threshold.

In some embodiments, the steps further include: determining, in response to that the utilizations of the cores in the multi-core BMC except the second core exceed the preset threshold, whether the utilization of the first core exceeds a second preset threshold; and allocating the new service to the first core, in response to that the utilization of the first core does not exceed the second preset threshold.

In some embodiments, the steps further include: suspending reception of the new service, in response to that the utilizations of the cores in the multi-core BMC except the second core exceed the second preset threshold.

In some embodiments, the allocating the new service to the second core in the multi-core BMC for operation includes: determining whether the firmware upgrade service in operation exists in the second core; and suspending input of the new service to the second core, in response to that the firmware upgrade service in operation exists in the second core.

In some embodiments, the steps further include: in response to that an exceptional process on other cores exists is detected, restarting the exceptional process.

Figure 2:
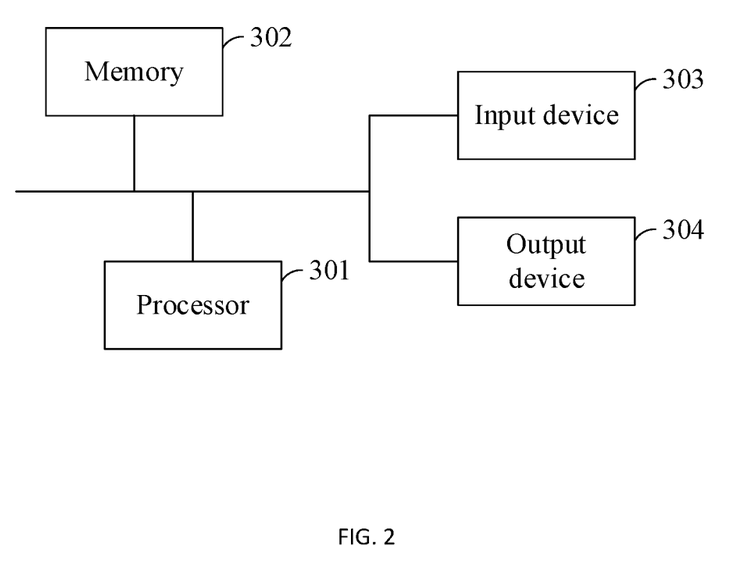
FIG. 2 is a schematic diagram of a hardware structure of an embodiment of a BMC-based switch monitoring computer device according to the present disclosure.

FIG. 2 is a schematic diagram of a hardware structure of an embodiment of a BMC-based switch monitoring computer device according to the present disclosure.

Taking the device shown in FIG. 2 as an example, the device includes a processor 301 and a memory 302, and may further include an input device 303 and an output device 304.

The processor 301, the memory 302, the input device 303, and the output device 304 may be connected by a bus or other manners. FIG. 2 takes connection by a bus as an example.

As a non-transitory computer-readable storage medium, the memory 302 may be used to store a non-transitory software program, and a non-transitory computer-executable program and module, e.g., program instructions/modules corresponding to the BMC-based switch monitoring method in the embodiments of the present application. The processor 301 runs the non-transitory software program, the instructions and the modules stored in the memory 302, thereby executing various types of function applications and data processing of a server, namely implementing the BMC-based switch monitoring methods of the above-mentioned method embodiments.

The memory 302 may include a program storage region and a data storage region. The program storage region may store an operating system and an application program required by at least one function. The data storage region may store data created according to the use of the BMC-based switch monitoring method, and so on. In addition, the memory 302 may include a high-speed random access memory (RAM), or a non-transitory memory, for example at least one disk storage device, flash storage device, or other volatile solid-state storage devices. In some embodiments, the memory 302 includes a remotely-arranged memory relative to the processor 301, and the remote memory may be connected to a local module through a network. Examples of the network include, but not limited to, the Internet, an intranet of an enterprise, a local area network, a mobile communication network, and a combination thereof The input device 303 may receive input information, for example a user name and a password. The output device 304 may include a display device, for example a display screen.

One or more program instructions/modules corresponding to the BMC-based switch monitoring method are stored in the memory 302, and when they are executed by the processor 301, the BMC-based switch monitoring method in any above-mentioned method embodiment may be implemented.

In any embodiment of the computer device that performs the above BMC-based switch monitoring method, effects the same as or similar to those in any corresponding method embodiment above may be achieved.

The present disclosure also provides a computer-readable memory medium, storing a computer program, when the computer program is executed by a processor, the above methods may be implemented.

It is finally to be noted that those of ordinary skill in the art may understand that all or part of the flows in the methods of the above-mentioned embodiments may be completed by a computer program instructing related hardware. The program for the BMC-based switch monitoring method may be stored in a computer-readable storage medium. When the program is executed, the flows of the respective method embodiments may be included. The storage medium storing the program may be a magnetic disk, an optical disk, a read-only memory (ROM), a RAM, or the like. The embodiments of the computer program may have effects the same as or similar to those in any corresponding method embodiments above.

The above are exemplary embodiments disclosed by the present disclosure, but it shall be noted that various changes and modifications may be made without deviating from the scope of disclosed by the embodiments of the present disclosure limited by the claims. The functions, steps, and/or actions of the method claims according to the disclosed embodiments described here need not be performed in any particular order. Furthermore, although the elements disclosed in the embodiments of the present disclosure may be described or required in individual form, they may also be understood as plural, unless expressly restricted to be singular.

It should be understood that, as used in the text, the singular "a" is intended to include the plural as well, unless the context clearly supports an exception. It should also be understood that "and/or" as used in the text means any and all possible combinations that include one or more associated listed items.

The above number of the embodiments of the present disclosure if for description only and does not represent the pros and cons of the embodiments.

The ordinary skilled person in the art may understand that all or part of the steps to realize the above embodiments may be accomplished by hardware or by a program that instructs the relevant hardware. The program may be stored in a computer readable storage medium, for example read-only memory, magnetic disk or optical disc.

The ordinary skilled person in the art should understood that the discussion of any embodiment above are exemplary only, and are not intended to imply that the scope of embodiments (including claims) of present disclosure are limited to such examples. Under the trail of thought of the embodiments of the present disclosure, combinations may also be made between the technical features of the above embodiments or different embodiments, and there are many other variations of different aspects of the embodiments of the present disclosure as above, which are not provided in detail for the purpose of brevity. Therefore, any omission, modification, equivalent substitution, improvement, and so on, made within the spirit and principles of the embodiment of the present disclosure shall be included in the scope of protection of the embodiments of the present disclosure.

The invention claimed is:

1. A baseboard management controller BMC-based switch monitoring method, comprising following steps:
   virtualizing a multi-core baseboard management controller (BMC) into a plurality of logical computers such that each core operates separately;
   starting a switch;
   in response to start of the switch, migrating all functions of the switch into a first core of the multi-core BMC for start, and monitoring other cores of the multi-core BMC based on a second core of the multi-core BMC;
   detecting a new service received by the switch;
   determining, in response to the detection of the new service, that the new service is a firmware upgrade service; and
   allocating the new service to the second core in the multi-core BMC for operation, in response to the new service being the firmware upgrade service.

2. The method according to claim 1, further comprising:
   detecting another new service received by the switch;
   determining, in response to the detection of the other new service, that the other new service is not the firmware upgrade service; determining whether a utilization of the first core exceeds a first preset threshold; and
   allocating the other new service to the first core for operation, in response to the utilization of the first core not exceeding the first preset threshold.

3. The method according to claim 2, further comprising:
   determining, in response to the utilization of the first core exceeding the first preset threshold, whether a utilization of a third core exceeds the first preset threshold; and
   allocating the other new service to the third core for operation, in response to the utilization of the third core not exceeding the first preset threshold.

4. The method according to claim 1, further comprising:
   detecting another new service received by the switch;
   determining, in response to the detection of the other new service, whether the cores in the multi-core BMC, except the second core, exceed the first preset threshold;
   determining, in response to the utilizations of the cores in the multi-core BMC, except the second core, exceeding the first preset threshold, whether the utilization of the first core exceeds a second preset threshold; and
   allocating the other new service to the first core, in response to the utilization of the first core not exceeding the second preset threshold.

5. The method according to claim 1, further comprising:
   determining whether the cores in the multi-core BMC, except the second core, exceed a second preset threshold;
   suspending reception of the new service, in response to the utilizations of the cores in the multi-core BMC, except the second core, exceeding the second preset threshold.

6. The method according to claim 1, wherein the allocating the new service to the second core in the multi-core BMC for operation comprises:
   determining whether the firmware upgrade service in operation exists in the second core; and
   suspending input of the new service to the second core, in response to the firmware upgrade service in operation existing in the second core.

7. The method according to claim 3, further comprising:
   determining, in response to the utilization of the third core exceeding the first preset threshold, whether a utilization of a fourth core exceeds the first preset threshold; and
   allocating the other new service to the fourth core for operation, in response to the utilization of the fourth core not exceeding the first preset threshold.

8. The method according to claim 4, further comprising:
   determining, in response to the utilization of the first core exceeding the second preset threshold, whether a utilization of a third core exceeds the second preset threshold; and
   allocating the other new service to the third core for operation, in response to the utilization of the third core not exceeding the second preset threshold.

9. The method according to claim 8, further comprising:
   determining, in response to the utilization of the third core exceeding the second preset threshold, whether a utilization of a fourth core exceeds the second preset threshold; and
   allocating the other new service to the fourth core for operation, in response to the utilization of the fourth core not exceeding the second preset threshold.

10. A non-transitory computer-readable storage medium, storing a computer program, wherein, when the computer program is executed by a processor, it implements operations comprising:
    virtualizing a multi-core baseboard management controller (BMC) into a plurality of logical computers such that each core operates separately;
    starting a switch;
    in response to start of the switch, migrating all functions of the switch into a first core of the multi-core BMC for start, and monitoring other cores of the multi-core BMC on a second core of the multi-core BMC;
    detecting a new service received by the switch;
    determining, in response to the detection of the new service, that the new service is a firmware upgrade service; and
    allocating the new service to the second core in the multi-core BMC for operation, in response to the new service being the firmware upgrade service.

11. A computer device, comprising:
    at least one processor; and
    a memory, wherein the memory stores computer instructions capable of running in the processor, and when the instructions are executed by the processor, the processor is configured to:
    virtualize a multi-core baseboard management controller (BMC) into a plurality of logical computers such that each core operates separately;
    start a switch;
    in response to start of the switch, migrate all functions of the switch into a first core of the multi-core BMC for start, and monitor other cores of the multi-core BMC on a second core of the multi-core BMC;
    detect a new service received by the switch;
    determine, in response to the detection of the new service, that the new service is a firmware upgrade service; and
    allocate the new service to the second core in the multi-core BMC for operation, in response to the new service being the firmware upgrade service.

12. The device according to claim 11, wherein the processor is further configured to:
    detect another new service received by the switch;
    determine, in response to the detection of the other new service, that the other new service is not the firmware upgrade service; determining whether a utilization of the first core exceeds a first preset threshold; and allocate the other new service to the first core for operation, in response to the utilization of the first core not exceeding the first preset threshold.

13. The device according to claim 12, wherein the processor is further configured to:

determine, in response to the utilization of the first core exceeding the first preset threshold, whether a utilization of a third core exceeds the first preset threshold; and allocate the other new service to the third core for operation, in response to the utilization of the third core not exceeding the first preset threshold.

14. The device according to claim 11, wherein the processor is further configured to:

detect another new service received by the switch;

determine, in response to the detection of the other new service, whether the cores in the multi-core BMC, except the second core, exceed the first preset threshold;

determine, in response to the utilizations of the cores in the multi-core BMC, except the second core, exceeding the first preset threshold, whether the utilization of the first core exceeds a second preset threshold; and allocate the other new service to the first core, in response to the utilization of the first core not exceeding the second preset threshold.

15. The device according to claim 11, wherein the processor is further configured to:

determine whether the cores in the multi-core BMC, except the second core, exceed a second preset threshold;

suspend reception of the new service, in response to the utilizations of the cores in the multi-core BMC, except the second core, exceeding the second preset threshold.

16. The device according to claim 11, wherein the processor is further configured to:

determine whether the firmware upgrade service in operation exists in the second core; and suspend input of the new service to the second core, in response to the firmware upgrade service in operation existing in the second core.

17. The device according to claim 13, the wherein the processor is further configured to:

determine, in response to the utilization of the third core exceeding the first preset threshold, whether a utilization of a fourth core exceeds the first preset threshold; and allocate the other new service to the fourth core for operation, in response to the utilization of the fourth core not exceeding the first preset threshold.

18. The device according to claim 14, wherein the processor is further configured to:

determine, in response to the utilization of the first core exceeding the second preset threshold, whether a utilization of a third core exceeds the second preset threshold; and allocate the other new service to the third core for operation, in response to the utilization of the third core not exceeding the second preset threshold.

\* \* \* \* \*